United States Patent Office 3,131,210
Patented Apr. 28, 1964

3,131,210
PROCESS FOR METHIONINE NITRILE SYNTHESIS
Robert Hügel and Adolfo Pasetti, Milan, Italy, assignors to Montecatini Società Generale per l'Industria Mineraria e Chimica, Milan, Italy
No Drawing. Filed Feb. 2, 1960, Ser. No. 6,122
Claims priority, application Italy Feb. 4, 1959
6 Claims. (Cl. 260—465.5)

The following invention relates to a process for the production of methionine. A product of high purity is obtained while employing a simpler operating cycle. The yields are higher than those obtained in hitherto known processes.

An object of this invention is to provide new methods for the preparation of substances commonly used in stages or phases of methionine production, which methods render said substances particularly suitable to the use to which they are destined. We refer particularly to beta-methylmercaptopropionaldehyde and methionine-nitrile.

In a known process, herein designated the first type, beta-methylmercaptopropionaldehyde is first reacted with HCN to prepare the cyanhydrin. The latter is then treated in a second stage with ammonia to replace the —OH group by an aminic group, to obtain methionine-nitrile which is then saponified to methionine.

The reactions constituting the basis of the first type of process are the following:

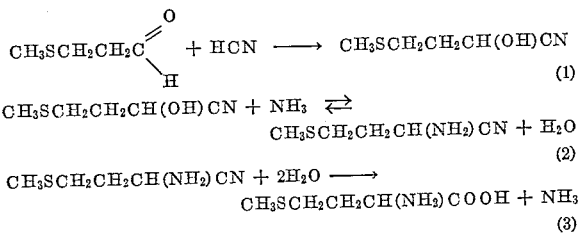

According to U.S. Patents 2,485,236 (1949), 2,542,-768 (1951), and 2,564,105 (1951) said cyanhydrin (1) is obtained by adding hydrocyanic acid to beta-methylmercaptopropionaldehyde in the presence of a slightly alkaline substance, such as pyridine.

In phase (2) of the said first type of process, ammonia is used in a ratio of 10–30 mols per mol of cyanhydrin, at a temperature of 80 to 90° C. and at a pressure of 40–50 atm. Under these conditions the reaction takes place in 15 minutes, whereas at room temperature it would take 12 to 15 hours. Upon saponification in an acid medium, methionine is obtained with final yields of about 75%.

In a second known type of process, methionine-nitrile is obtained in a single operation and in a single phase reaction. Beta-methylmercaptopropionaldehyde is reacted with sodium cyanide, an ammonium salt, and an excess of ammonia, in alcoholic water solution.

In the processes of the second type, amino-nitrile is obtained in a single operation, according to the following reaction:

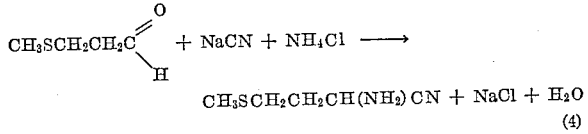

D. O. Holland, J. Chem. Soc. (1952), pages 3403 to 3409, describes a method for the preparation of methionine-nitrile consisting in diluting sodium cyanide and ammonium chloride in equimolar proportions in an $NH_3$ saturated alcohol-water mixture, 13 to 14 mols of $NH_3$ being employed per mol of beta-methylmercaptopropionaldehyde, said aldehyde being then gradually added while keeping the temperature at 15 to 20° C. The mixture is then agitated and left to react for more than 12 hrs.

U.S. Patent No. 2,732,400 (1956) describes a process of reacting beta-methylmercaptopropionaldehyde with an alkaline cyanide (NaCN) and with an ammonium salt ($NH_4Cl$) in an $NH_3$ saturated alcoholic water solution ($NH_3$ being present in great excess, i.e. from 3 to 15 mols per mol of aldehyde). Reaction takes place at room temperature in a number of hours. When the reaction is over, vacuum distillation is carried out at a temperature not exceeding 35° C., to remove the alcohol. In the reaction vessel there remain two layers, the upper oily layer containing methionine-nitrile and the lower aqueous layer containing salts. Methionine-nitrile is then separated from the aqueous salt solution by extraction with ether or chloroform, and subsequent solvent distillation. The methionine-nitrile is then subjected to saponification with an alcoholic water solution of sodium or potassium hydroxide, and upon neutralization with acetic acid methionine is precipitated with yields of 63% in respect to the beta-methylmercaptopropionaldehyde. According to this patent, it is also possible to carry out the nitrile saponification directly, by adding sodium hydroxide, water and methanol to the reaction mixture. The operation takes 19 minutes at boiling temperature, and is followed by neutralization with acetic acid, thus separating methionine with yields of 48% in respect to beta-methylmercaptopropionaldehyde.

The applicants have discovered that the process described immediately above, for obtaining methionine-nitrile, can be greatly improved by using anhydrous liquid ammonia, at a temperature range between —10 and 50° C., preferably between 10 and 25° C., as solvent and reaction medium for the substances that are reacted to produce methionine-nitrile. Said substances are beta-methylmercaptopropionaldehyde and hydrocyanic acid, or mixtures of soluble cyanides with ammonium salts. In the presence of liquid ammonia, under the indicated conditions, they produce methionine-nitrile directly.

When the reaction is over, the excess ammonia is evaporated. If the operation has been carried out with ammonium cyanide, from $HCN+NH_3$, said methionine-nitrile and water are left as residue after evaporation. When alkaline or earth-alkaline cyanides and ammonium salts are employed, the residue consists of nitrile and inorganic salts dissolved in water. In both cases methionine-nitrile is obtained in almost quantitative yields.

With this process it is possible to avoid any need for the preparation of the cyanhydrin in a separate operation, and also to avoid the difficulties encountered in separation of nitrile from the excess $NH_3$ in alcoholic aqueous solution. In fact, the liquid ammonia used by the applicants can be distilled at room temperature. Methionine-nitrile is converted to methionine by means of hydrolysis in acidic medium, with subsequent neutralization with ammonia, and purification of raw methionine according to conventional techniques.

The applicants have also found that, in the preparation of beta-methylmercaptopropionaldehyde by reacting methylmercaptan and acrolein, which constitutes the first step in the operating cycle for production of methionine, ammonium mercaptide can be advantageously used as a catalyst, instead of the substances commonly employed heretofore. The advantage is that if beta-methylmercaptopropionaldehyde is to be isolated, the ammonia of ammonium mercaptide can be easily removed by a single, simple distillation. There is also the advantage that no substances are introduced, other than the reaction substances. This renders the process particularly advantageous when the beta-methylmercaptopropionaldehyde is used in the preparation of methionine. It is surprising and was unforeseen that it is possible to obtain good results by using ammonium mercaptide, since it is known that strong bases have a negative or detrimental effect on the reaction, inasmuch as the beta-methylmercaptopropionaldehyde is polymerized by highly alkaline substance. Because of this, previous investigators of this reaction were induced to use weak bases. The ammonium methyl mercaptide is advantageously used in a proportion of 0.1 to 1% by weight of the methyl mercaptan and acrolein combined. The preferred range is 0.2 to 0.4%.

The advantages, in respect to known methods, obtained by the herein-claimed process for preparation of methionine are the following: markedly high yields are obtained, namely 80 to 90% in respect to the beta-methylmercaptopropionaldehyde; the high purity of the final product; a titer in methionine from 99 to 99.2%; and great simplification of the operating cycle, with favorable quantitative ratios of the raw materials used. The high yield and the high purity of the final product are believed to be due to the fact that by using liquid ammonia as a solvent, nitrile is quickly obtained at low temperature by ammonia evaporation.

In contrast thereto, during the operating cycle of the known processes, the nitrile reaches markedly higher temperatures, that is, temperatures near room temperature, for a longer period of time. This results in alteration of the nitrile, so that the final methionine yield is unfavorably affected.

The following examples provide specific embodiments of the invention, but without intent to thereby restrict its scope.

EXAMPLE 1

Preparation of the Aldehyde

Into a glass flask cooled to 5° C., 2 mols of liquid methylmercaptan are introduced together with 0.3% by weight of ammonium salt of the same methylmercaptan. Also anhydrous ammonia gas can be directly introduced, advantageously.

While agitating the flask and maintaining the temperature at 5° C., one mole of newly distilled and stabilized acrolein is slowly added to the mixture. The reaction time was one hour.

The excess methylmercaptan is then distilled, obtaining as a residue 107 gr. of technical grade beta-methylmercaptopropionaldehyde. The product obtained is distilled at +60° C. and 12 mm. Hg, thus obtaining 101 gr. of pure beta-methylmercaptopropionaldehyde: boiling point 60° C. at 12 mm. Hg; $n_D^{20}=1.4811$.

EXAMPLE 2

Preparation of the Nitrile 0.85 liter of liquid anhydrous ammonia, 1.1 mols sodium cyanide, and 1.2 mols ammonium chloride are introduced into an autoclave. The mixture is agitated and one mol beta-methylmercaptopropionaldehyde is added to it.

The autoclave is closed, brought to room temperature for 90 minutes and then, while always keeping it at room temperature, ammonium is discharged. A residue remains consisting of methionine-nitrile and of a saturated solution of salts. Methionine-nitrile is subsequently separated from the salts by filtration.

EXAMPLE 3

Into an autoclave, 1.8 mols HCN and 2 liters anhydrous liquid ammonia are introduced. While continuously agitating, 1.5 mols of beta-methylmercaptopropionaldehyde are then added to the mixture. The autoclave is closed, brought to room temperature for 90 minutes and ammonia is discharged, while keeping it at room temperature. The methionine-nitrile is obtained in nearly quantitative yields. It remains as a resdue together with the reaction water.

EXAMPLE 4

Preparation of Methionine-Nitrile and Methionine 0.85 liter of anhydrous liquid ammonia, 1.1 mols sodium cyanide, and 1.2 mols ammonium chloride are introduced into an autoclave. The mixture is agitated and then one mol of beta-methylmercaptopropionaldehyde prepared according to Example 1 is added. The autoclave is closed, brought to room temperature for one and half hours and ammonia is discharged.

The methionine-nitrile, obtained in nearly quantitative yield, remains as a residue together with water and the reaction salts, from which it is then separated by filtration. The filtered product is introduced dropwise, under vigorous stirring and while maintaining the temperature at 25° C. by cooling, into a solution of 196 gr. of concentrated sulfuric acid and 180 gr. of water.

The mixture is then boiled for one and a half hours.

After cooling, an aqueous solution containing 15% ammonia is added, while neutralizing at a pH of 6. A colorless methionine precipitates together with ammonium sulfate at nearly an equal ratio. The product is filtered and washed on the filter with mother liquor coming from a previous crystallization of technical grade methionine. 130 grams of technical grade methionine are thus obtained, which are dissolved in 1 to 1.2 liters of boiling mother liquors from the previous crystallization.

Activated carbon is added to the mixture, which is kept boiling for a quarter of an hour and then filtered and left to crystallize at room temperature.

128.5 gr. of methionine containing 99.2% of pure methionine are obtained, with a yield (in respect to beta-methylmercaptopropionaldehyde) of 85% of the theoretical yield.

EXAMPLE 5

1.8 mols of hydrocyanic acid and 2 liters of liquid ammonia are introduced into an autoclave. The mixture is agitated and then 1.5 mols of beta-methylmercaptopropionaldehyde are added to the same. The autoclave is closed, brought to room temperature for one and a half hours and then ammonia is discharged.

The methionine-nitrile is obtained in almost quantitative yield. It remains as a residue together with the reaction water, and is introduced dropwise, under vigorous stirring and while keeping the temperature at 25° C. by cooling, into a solution containing 294 gr. of sulfuric acid in 270 gr. of water.

The mixture is then boiled for one and a half hours.

After cooling, a 15% aqueous solution of ammonia is added, neutralizing at pH 6. An almost colorless methionine product precipitates togetherwith ammonium sulfate at nearly an equal ratio.

The product is filtered, and then washed on the filter with a mother liquor coming from a previous crystallization of technical grade methionine. 195 gr. of technical methionine are obtained which are dissolved in 1.5 to 1.7 liters of boiling mother liquors from previous crystallizations. Activated carbon is added to the mixture which is kept boiling for a quarter of an hour and then filtered and left to crystallize at room temperature.

193 gr. of methionine having 99.2% purity are obtained. This corresponds to a yield, in respect to beta-methylmercaptopropionaldehyde, of 85% of the theoretical.

We claim:

1. A process of making methionine-nitrile comprising treating beta-methylmercaptopropionaldehyde, in anhydrous liquid ammonia, with hydrocyanic acid derived in situ in the reaction mixture from a mixture of a cyanide and an ammonium halide, said treating being in a range from about −10° to +50° C. the cyanide being taken from the group consisting of alkali metal cyanides and alkaline earth metal cyanides.

2. The process of claim 1, carried out at room temperature.

3. A process of making methionine-nitrile comprising treating beta-methylmercaptopropionaldehyde with hydrocyanic acid in anhydrous liquid ammonia at from about −10° to +50° C.

4. The process of claim 3, carried out at room temperature.

5. A process of making methionine-nitrile comprising reacting together alkali metal cyanide, ammonium chloride, and beta-methylmercaptopropionaldehyde in anhydrous liquid ammonia, in a range from about −10° to +50° C., and evaporating ammonia from the reaction mixture, so that the methionine-nitrile is obtained without prior preparation of the corresponding cyanohydrin.

6. The process of claim 5, carried out at room temperature.

References Cited in the file of this patent

UNITED STATES PATENTS

| | | |
|---|---|---|
| 2,485,236 | Gresham et al. | Oct. 18, 1949 |
| 2,521,677 | Vander Weele | Sept. 12, 1950 |
| 2,523,633 | Pierson et al. | Sept. 26, 1950 |
| 2,564,105 | Gresham et al. | Aug. 14, 1951 |
| 2,732,400 | Weiss | Jan. 24, 1956 |